Dec. 30, 1924.
A. McD. McAFEE
1,520,831
METHOD OF RECOVERING ALUMINUM CHLORIDE
Filed March 1, 1923
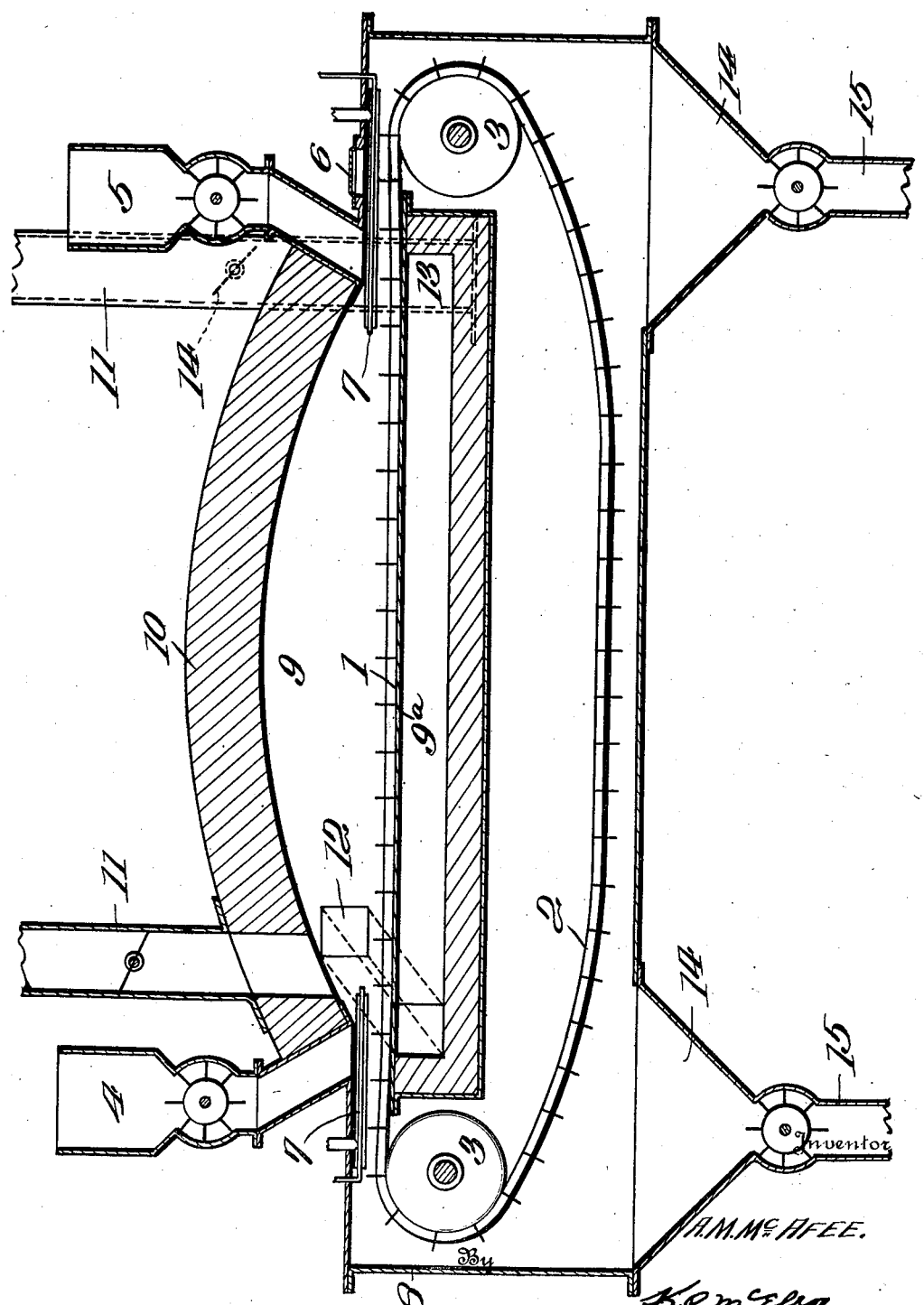

Patented Dec. 30, 1924.

1,520,831

UNITED STATES PATENT OFFICE.

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS.

METHOD OF RECOVERING ALUMINUM CHLORIDE.

Application filed March 1, 1923. Serial No. 622,214.

*To all whom it may concern:*

Be it known that I, ALMER M. MCAFEE, a citizen of the United States, residing at Port Arthur, in the county of Jefferson and State of Texas, have invented certain new and useful Improvements in Methods of Recovering Aluminum Chloride, of which the following is a specification.

This invention relates to methods of recovering aluminum chloride; and it comprises an improvement in the methods of recovering aluminum chloride from exhausted sludges resulting from the treatment of petroleum oils and containing the same, wherein such a sludge is heated and carbonized as a traveling layer at a high temperature with a limited access of air in heat-receiving proximity to flame and flame gases originating from it with the aid of the air; all as more fully hereinafter set forth and as claimed.

Anhydrous aluminum chloride is now largely used in various catalytic processes of changing the character of petroleum oils and improving their quality, as in the manufacture of gasoline and the like from heavier oils by boiling such a heavy oil with it. In other processes, heavy oils are improved in quality, freed of unsaturated groups, etc., by warming with anhydrous aluminum chloride. Aluminum chloride is not greatly soluble in the petroleum oils and when the anhydrous chloride is added to warm petroleum oils, it melts down or combines with a portion of the oil to form a heavy oily liquid layer, immiscible with the rest of the oil. In practice, this heavy liquid is kept stirred up through the rest of the oil by agitating or circulating devices. In all these methods there is found a limit to the period of high activity of a given charge of fresh aluminum chloride; it is at first highly active and then its activity begins to slacken progressively. It is therefore the custom to withdraw such a charge after a time, either using it for other purposes in which its remaining activity may be useful or sending it to a recovery plant for recovery of the chloride in active form. Ultimately, it all goes to the recovery plant. As the catalytic activity of the charge becomes exhausted, its physical nature changes, the original heavy oily liquid becoming thicker, tarry and viscous. It may even become of coky character. These residual materials are called sludge in the art; and the present invention relates to an improvement in the treatment of such sludges in the recovery plant.

It is the presumption that the melting down of the aluminum chloride with the hot oil is due to the formation of compounds of some kind between the oil, or constituents of the oil, and the aluminum chloride; and that the slackening and exhaustion of activity are due to a change in the character of the hydrocarbon compounds which are associated with the aluminum chloride; these compounds becoming more and more asphaltic in their nature. Whatever the theory, the facts are as stated.

Since only the anhydrous aluminum chloride is active in the stated ways, care is taken throughout the operation to prevent, as far as possible, the presence of moisture. Water at once acts on the anhydrous chloride, giving, according to circumstances, hydrochloric acid gas and alumina or the hydrated chloride, a substance of no activity. In methods using anhydrous aluminum chloride, contact of air, and particularly moist air, with the chloride or with the sludges resulting from its use, is avoided as far as possible, since such access results in a loss of active chloride.

The sludge, when withdrawn, is usually allowed to stand for a time in a warm condition to permit a separation of mechanically entangled oil. The settled and compacted mass is ready for the recovery operation. It contains, in addition to the aluminum chloride-hydrocarbon complexes, more or less of this free oil and, generally, more or less coke or free carbon. The recovery operation is in two stages; firstly, a heating to expel or carbonize the contained hydrocarbons and leave a carbonized or cooked residue containing the aluminum chloride; and secondly, the recovery operation proper, in which this carbonized residue is treated to volatilize the aluminum chloride. In spite of the high vapor tension of aluminum chloride, which may reach atmospheric pressure at 365° F., practically none volatilizes during the carbonization, although the carbonization temperature may go as high as 800° F. The aluminum chloride is fixedly held by the carbonized residue at this temperature range. In recovery, however, it may be volatilized either by a higher temperature, say, 1200° to 1400° F., or by the action of a small amount of chlorin at less temperatures. In either event, anhydrous aluminum chloride distils out of the carbonized material and may be condensed as such and sent back for re-use in the oil processes.

Both the carbonization and the recovery proper have been effected in externally heated retorts, closed against the access of air. Carbonization in closed retorts is expensive and unsatisfactory for many reasons. In carbonization, there is a copious production of oil vapors and gases by distillation and decomposition. This formation of vapors and gases is quite endothermic, requiring a considerable amount of heat and the delivery of this heat to the coking mass through the walls of the retort requires time and is of course expensive. Nor is it possible to use a retort of any large size. Many retorts are necessary to take care of the sludge produced on even a moderate scale of work.

I have found that coking or carbonization of the sludge can be much more advantageously effected by a direct delivery of heat to the sludge; the vapors and gases given off from the mass undergoing carbonization being directly burnt in heat-delivering relationship to the mass by the admission of a certain amount of air. So long as the material is freely evolving vapors and gases, the air does not come into actual contact with it; the vapors and gases burning above the mass but not directly in contact with it. All the heat necessary for carbonization may be so afforded, or, in the event that the sludge happens to be poor in free oil, a certain amount of oil, such as fuel oil, may be admixed with it. In so heating the sludge, there is not the limitation as regards capacity incident to the use of retorts. In practice, I advance a traveling layer or body of the sludge through a heating chamber with walls of such character as to reverberate heat upon the layer and admit a certain amount of air above the layer to burn the evolving vapors and gases. The air so admitted may travel in the same direction as the material to be carbonized; or in the opposite direction—in countercurrent. In the former event, the exit temperature of the flame gases is commonly much above the entry temperature of the material to be carbonized and it is useful to return such gases beneath the floor of the chamber to utilize some of their heat. The air burning the vapors and gases never really comes into contact with the coking sludge and no deleterious effect from its contained moisture need be feared. So long as the heat is sufficient to cause a free delivery of vapors and gases, the air cannot come into contact with the sludge undergoing carbonization.

In the specific embodiment of my invention now found most advantageous, the fresh sludge is delivered to any suitable type of conveyor mechanism and is advanced through a hot refractory walled tunnel-like heating chamber, while at the same time a certain amount of air is fed into the chamber either at or near the point of entry of the sludge or near the point of delivery of carbonized sludge. In either event, as soon as the sludge is carbonized, it is removed from the flame chamber. In beginning operation, the refractory walled chamber may, of course, be heated to a high temperature by burning a little gas or oil in it. Afterwards, it takes care of itself. On entering the chamber, the influence of the heat causes distillation with production of vapors and gases which at once take fire, forming flame and flame gases which sweep forward through the chamber above and in heat-delivering relationship to the traveling layer of sludge. When the evolution of vapors and gases become insufficient to shield the layer from the air, the flame and flame gases are diverted from contact with the layer. The material at this time is coked sufficiently for further treatment for the recovery of active aluminum chloride by sublimation.

In the accompanying illustration, I have shown more or less diagrammatically, one form of apparatus useful in the performance of my process. The view is a vertical longitudinal section through the furnace. The floor 1 of the furnace may be of metal or tile adapted to transfer heat, and it is traversed by the conveyor 2 running over the driving wheels 3, driven from a source of power, not shown. The spent sludge may be fed in by means of the hopper 4 at the left hand end or the hopper 5 at the right hand end, each provided with a feeding wheel adapted to seal the hoppers against exit of gases from the furnace. At the right-hand end, I have shown flue 6 for the purpose of admitting air and at either end is oil or oil and gas burner 7 for use in starting the process. Usually, the oil in the chamber can simply be ignited. Around the conveyor as it travels under the floor 1 is the outside casing 8, arranged to prevent access of moisture to the under flight of the conveyor. The heating chamber 9 is provided with reverberatory roof 10 and stack 11 at each end. Flue 12 leads from the heating chamber 9 to the flue 9$^a$ and the gas may be passed from this flue 9$^a$ under the floor 1 to heat it. These gases go from the flue 9$^a$ through flue 13 to stack 11 on the right hand end and the draft may be regulated by dampers 14 in the stack and damper in the flue 12.

By this arrangement, the conveyor may travel in the heating chamber 9 from left to right, with air admitted at the right hand end through flue 6, this flow being in countor current. Under these conditions, some of the gases may be tapped off through flue 12 and used in flue 9ª for heating the floor. The spent sludge under these conditions is admitted at the left hand end through the hopper 4. If the flow is reversed—caused to travel from right to left—then the air admitted at the right hand end travels in the same direction. In this event, some of the gases may be tapped off at 12 as above described. The carbonized residue may be collected from either end in the hoppers 14 and sent to storage tanks or to the furnace for the next step in the recovery through conduits 15, provided with feeding wheels, sealing the conduits 15 against access of moisture.

What I claim is:—

1. In the recovery of anhydrous aluminum chloride from oil residues containing the same the steps which comprise heating such residues under conditions permitting access of air and ignition of oil vapors until contained oil is removed in whole or in part, and thereafter continuing the heating in the absence of air.

2. In the recovery of anhydrous aluminum chloride from oil residues containing the same the process which comprises heating such residues in a hot-walled chamber under an overlying air current until evolution of vapors slackens or substantially ceases and thereafter continuing the heating under exclusion of air.

3. In the carbonization of oily residues containing anhydrous aluminum chloride the process which comprises heating said residues in the base of a hot-walled chamber with access of air to the upper part of said chamber until evolution of combustible vapors slackens or ceases and then removing the carbonized residues from said chamber.

4. In the carbonization of oily residues containing anhydrous aluminum chloride the process which comprises advancing said materials through a hot walled chamber for such a length of travel and such a time as is necessary to carbonize contained organic matters, a current of air being allowed to flow through the upper part of said chamber over the advancing body of material during the period of travel and removing the material from the chamber when carbonization is effected.

5. In the treatment by heat of oil residues containing anhydrous aluminum chloride for the recovery of such chloride, the process which comprises heating the residue in the presence of air so long as the evolution of vapors and gases from the material is sufficient to prevent actual contact of such air with such material and thereafter continuing the heating in the absence of air.

6. The process of carbonizing catalytic residues used in the treatment of oils, which comprises burning the oils of said residue with limited access of air under conditions causing the heating of the residue, moving the residue while thus heated through the heating zone and delivering it after said heating outside the heating zone.

7. The process of carbonizing aluminum chloride residues used in the treatment of oils, which comprises passing the residue as a traveling mass through a heated zone, burning the oil contained in the residue to furnish the heat, and delivering the carbonized residue from the heated zone.

8. The process of carbonizing aluminum chloride residues used in the treatment of oils, which comprises passing the residue as a traveling mass through a heated zone, burning the oil contained in the residue to furnish the heat, and delivering the carbonized residue from the heated zone out of contact with the air.

9. The process of carbonizing aluminum chloride residues used in the treatment of oils, which comprises passing the residue as a traveling mass through a heated zone, burning the oil contained in the residue to furnish the heat, passing the products of combustion under the traveling mass to assist in the heating thereof, and delivering the carbonized residue from the heated zone.

In testimony whereof, I have hereunto affixed my signature.

ALMER McDUFFIE McAFEE.